United States Patent Office 2,721,869
Patented Oct. 25, 1955

2,721,869
5-CARBALKOXY RHODANINES

John J. D'Amico, Charleston, W. Va., assignor to Monsanto Chemical Company, St. Louis, Mo., a corporation of Delaware No Drawing. Application June 16, 1954,
Serial No. 437,303

5 Claims. (Cl. 260—306.7)

The present invention relates to a new class of chemical compounds and to methods for their preparation. The new compounds may be represented by the following structural formula

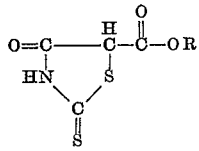

where R represents an alkyl group, an aralkyl group or an alicyclic group. Suitable examples comprise methyl, ethyl, propyl, butyl, amyl, hexyl, octyl, decyl, benzyl, β-phenethyl and cyclohexyl radicals. The compounds vary in physical properties from solids where R is hydrogen or a short chain alkyl radical to liquids.

The new compounds are obtained by the reaction of an alkyl ester of chloromalonic acid and ammonium dithiocarbamate. Thus, it was discovered that this reaction led to the formation of 5-substituted rhodanines instead of alkyl 4-alkoxy 2-mercapto-5-thiazolecarboxylates. The bromo and iodo malonic acid esters are also suitable in the process and may be substituted.

The following is typical of the preparation of the new compounds:

5-carbethoxyrhodanine.—To a stirred solution containing 110 grams (1.0 mole) of ammonium dithiocarbamate in 800 ml. of water was added 194.6 grams (1.0 mole) of diethyl chloromalonate. Immediately an exothermic reaction set in, causing the temperature to rise from 20° to 39° C. The reaction mixture was stirred at 20–25° C. for two days and allowed to stand at 0–10° C. for an additional two days. The precipitate was filtered, washed with water until the washings were neutral to litmus and dried at 50° C. The product, a yellow colored solid, M. P. 82–84° C., was obtained in 42.5% yield. After recrystallization from dilute ethyl alcohol it melted at 85–86° C. Upon analysis there was found 3.60% hydrogen, 6.84% nitrogen and 31.24% sulfur as compared to 3.44% hydrogen, 6.83% nitrogen and 31.24% sulfur calculated for $C_6H_7NO_3S_2$.

The reaction temperature should be kept below the temperature of decarboxylation which in the case of the foregoing example is about 80° C. At this and higher temperatures rhodanine is the product. Rhodanine was obtained by a procedure similar to that described above except after the addition of diethyl chloromalonate the reaction mixture was stirred at 20–30° C. for 3 hours and then stirred at 70–80° C. for 16 hours. After cooling to 0° C. the precipitate was filtered, washed with water until the wash water was neutral to litmus and dried at 50° C. A 50% yield of rhodanine, M. P. 166–167° C., after recrystallization from acetic acid was obtained. A mixed melting point with authentic rhodanine was not depressed. Analysis gave 10.31% nitrogen, and 2.39% hydrogen as compared to 10.52% nitrogen and 2.27% hydrogen calculated for $C_3H_3NOS_2$.

The new compounds have useful accelerating properties particularly for the vulcanization of synthetic rubber. A vulcanizable stock was compounded comprising

| | Parts by weight |
|---|---|
| GR–S 100 | 100.0 |
| Carbon black | 50.0 |
| Zinc oxide | 4.0 |
| Saturated hydrocarbon softener | 10.0 |
| Stearic acid | 2.0 |
| Sulfur | 1.75 |
| 5-carbethoxyrhodanine | 1.2 |

The stock so compounded was vulcanized in the usual manner by heating in a press for 90 minutes at 144° C. The physical properties of the vulcanizate were as follows:

Table 1

| Modulus of elasticity in lbs./in.² at elongation of 500% | Tensile at break-in lbs./in.² | Ultimate elongation percent |
|---|---|---|
| 1300 | 2150 | 840 |

It is intended to cover all changes and modifications of the examples of the invention herein chosen for purposes of disclosure which do not constitute departures from the spirit and scope of the invention.

What is claimed is:

1. A compound of the structure

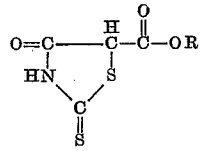

where R is a radical containing less than 11 carbon atoms selected from a group consisting of alkyl, aralkyl and cyclohexyl radicals.

2. 5-carbalkoxy rhodanine having less than 11 carbon atoms in the alkoxy group.

3. 5-carbethoxyrhodanine.

4. The method of making 5-carbalkoxyrhodanine which comprises reacting dialkyl chloromalonate containing less than 11 carbon atoms in each alkyl group with ammonium dithiocarbamate.

5. The method of making 5-carbethoxyrhodanine which comprises reacting diethyl chloromalonate with an aqueous solution of ammonium dithiocarbamate at 20–39° C.

No references cited.